March 23, 1943.  W. A. RAY  2,314,599

THERMOSTAT

Filed July 27, 1940

WILLIAM A. RAY,
INVENTOR.

By John H. Rouse,
ATTORNEY.

Patented Mar. 23, 1943

2,314,599

UNITED STATES PATENT OFFICE 2,314,599

THERMOSTAT

William A. Ray, Glendale, Calif.

Application July 27, 1940, Serial No. 348,065

10 Claims. (Cl. 200—138)

My present invention relates to thermostats and more particularly to those of the type adapted for controlling the operation of temperature changing means for a space or room.

One of the objects of my invention is to improve the construction of a room thermostat of the type shown in my copending application, Serial No. 258,253, filed February 24, 1939, wherein a heat-collecting plate, directly exposed to the air of the room and detachably mounted on a heat-insulating base, functions as substantially the sole means for affecting a temperature responsive switching device. This improvement includes the provision of a sub-plate secured to the inner surface of the heat-collecting plate, which sub-plate serves to facilitate the mounting of various parts, such as a housing for the temperature responsive device and mounting and contact clips, without disfigurement of the front surface of the heat-collecting plate.

It is desirable to provide means for opening the thermostat circuit during certain periods, such as at night, so that the temperature changing means is rendered inoperative during that period, regardless of the departure of the room temperature from that normally desired. Such a "night cut-off" is usually in the form of a snap switch mounted on the thermostat. It is therefore another object of my invention to provide simple and effective means for maintaining the circuit of a thermostat in open condition, which thermostat is provided with temperature adjusting means, without the requirement for a separate switch.

A more specific object is to provide means for limiting the movement of the temperature responsive means of a thermostat toward circuit-closing position so that, when the temperature adjusting means is set at a point beyond that required for a predetermined temperature, the thermostat contacts are prevented from closing.

A still further object of my invention is to provide simple and effective means for applying a friction-producing force to the adjusting screw of a thermostat.

Other objects and advantages of my invention will be found in the description, the drawing, and the appended claims.

For complete understanding of the invention, reference may be had to the following detailed description and accompanying drawing, wherein.

Figure 1:
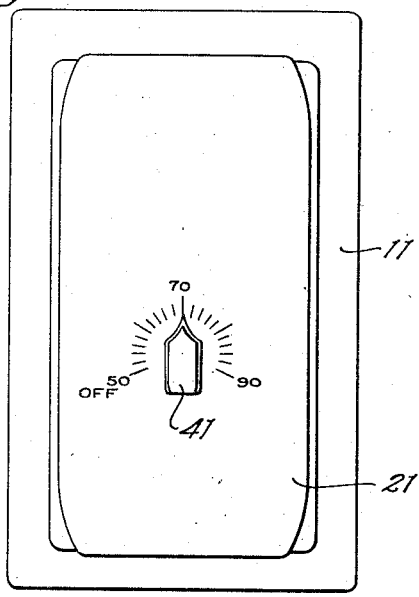
Figure 1 is a front elevation of a thermostat embodying my invention.

In the drawing, the numeral 11 indicates a base member, of insulating material such as molded "Bakelite," adapted for mounting on the wall of a room; one opening for a mounting screw being shown at 12, another (not shown) being in the corresponding upper thickened portion of the base. Secured to the upper portion of the base by terminal screws 13 are contact strips 14, the bent-over upper ends of which extend into recesses 15. An opening 16 is provided in the back wall of the base through which external wiring may be brought to the terminals, a ridge 17 serving to confine the wiring to the area adjacent the terminals.

Figure 3:
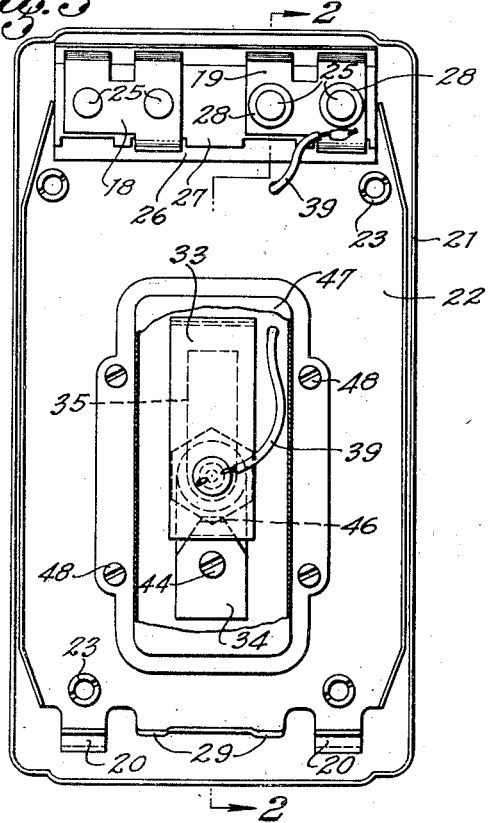
Figure 3 is a back elevation of the thermostat with its mounting base removed.
Figure 2:
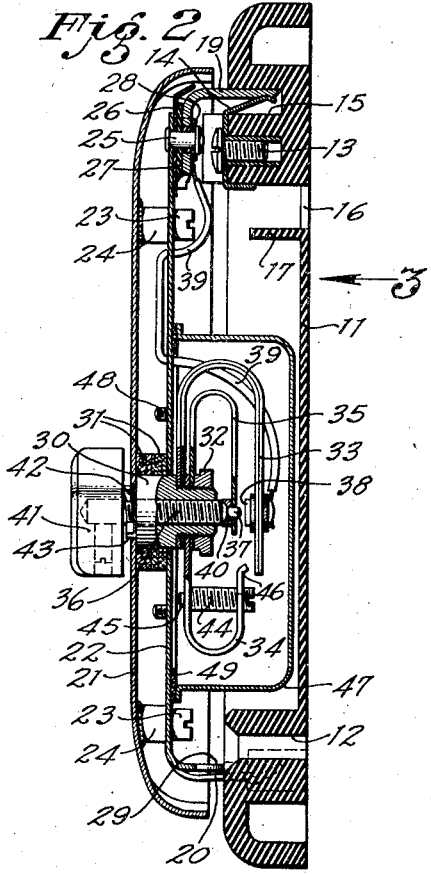
Figure 2 is an enlarged sectional view of the thermostat shown in Fig. 1, taken along the irregular line 2—2 of Fig. 3.

Detachably mounted on the base, by contact lugs 18 and 19 which extend within the recesses 15 and cooperate with the contact strips 14, and by spring clips 20 received in recesses formed in the thickened lower portion of the base, is the thermostat assembly shown in Fig. 3. This assembly comprises an outer main plate 21 (the design of which is claimed in my Design Patent No. 121,702, issued July 30, 1940), of good heat-conducting metal, and a metallic inner sub-plate 22 which is secured to the inner surface of the outer plate by slotted nuts 23 threaded on bosses 24, soldered or brazed to the front plate. The spring clips 20 are formed by inwardly bent portions of the sub-plate, and the angled contact lugs 18 and 19 are secured to the sub-plate by rivets 25, insulating strips 26 and 27 being interposed between the sub-plate and the lugs. The lug 18 is electrically connected to the sub-plate by the rivets, and the lug 19 is insulated from the rivets, and hence from the sub-plate, by insulating sleeves surrounding the shanks of the rivets and by washers 28. The outer edge of the insulating strip 26 is extended over the corners of the contact lugs as protection against shorting of the same to the inwardly turned edge of the outer plate if either of these parts are slightly mispositioned or deformed. The thermostat assembly is maintained in spaced relation to the base by the engagement of the ends of the contact lugs with the bottom of the recesses 15, and by the engagement with the base of inwardly bent bottom portions 29 of the sub-plate. By this arrangement the inner surface of the outer plate is also exposed to the air.

Intimately secured, as by solder or brazing, to the inner surface of the front plate, and surrounding an opening therein, is a hollow stud 30 of good heat-conducting metal which extends through an opening in the sub-plate; felt washers 31 being provided for sealing the latter opening against dust. Mounted on the reduced inner end portion of the stud, by a nut 32, are three U-shaped strip members—a bimetallic member 33, a stop member 34, and a tension member 35. Threaded in the hollow stud is an adjusting screw 36 which carries on its inner end a contact element 37 cooperable with another contact element 38, insulatingly mounted on the free arm of the bimetallic member, and connected by a flexible insulated lead 39 to the terminal lug 19. The contact element 37, being uninsulated, is in electrical connection with the terminal lug 18 through the sub-plate. The end portion of the free arm of member 35, which member is preferably made of spring material such as "phosphor bronze," is provided with an opening through which the contact element 37 extends. The member is so bent that an outward longitudinal force is applied by it to the adjusting screw 36 through a bushing 40 loosely surrounding the contact element and the end of the screw. This force produces uniform friction in the movement of the adjusting screw, regardless of the freedom of its fit in the stud. Secured by a set screw to the outer end of the adjusting screw is a knob 41, the indicating pointer of which cooperates with temperature graduations embossed on the front plate. Integrally formed on the inner surface of the knob is a finger 42 which cooperates with abutments 43, formed by cutting away a portion of the reduced end of stud 30 which extends through the front plate, to limit the rotation of the knob to the angle included by the graduations.

The stop member 34, which is also preferably of "phosphor bronze," is provided with an adjusting screw 44 which is threaded in the free arm of the member and has a reduced pilot end portion 45 received in a hole formed in the fixed arm. The bent-up reduced end portion 46 of the free arm of this member is adapted to engage and thus limit the movement of the bimetallic member toward contact-closing position. When the thermostat is employed for controlling means for heating the room wherein it is mounted, the bimetallic member is arranged to warp toward contact-closing position on fall of temperature and the stop member is so adjusted that it engages the bimetal when the temperature is slightly above the minimum limit of the adjusting screw. In the embodiment herein illustrated, the stop is adjusted to engage the bimetal at 54° so that when the adjusting knob is at 50° no engagement of the contact elements can occur, regardless of how low the temperature may fall.

The thermostat is protected from dust and moisture by a housing 47 secured to the sub-plate by screws 48, a gasket 49 being provided between the surfaces of the housing and the sub-plate. The thermostat, being thus sealed from the atmosphere, is affected substantially solely by the temperature of the heat-collecting front plate, by conduction through the stud 30.

While I have herein shown and described a specific embodiment of my invention, I wish it to be understood that modifications may be made without departing from the spirit of my invention and that I intend therefore to be limited only by the scope of the appended claims.

I claim as my invention:

1. In a thermostat: a base member of heat insulating material and adapted to be supported by the aid of a wall, a plate detachably mounted on said base, a temperature responsive condition-controlling element supported by said plate and between the base and the plate, and a sub-plate mounted on the inner surface of said plate for supporting means associated with said element.

2. In a thermostat: a base member of heat insulating material and adapted to be supported by the aid of a wall, a metallic plate overlying said base, a temperature responsive condition-controlling element supported by said plate and between the base and the plate, a sub-plate mounted on the inner surface of said plate, and means carried by said sub-plate for detachably securing said plate to said base.

3. In a thermostat: a base member of heat insulating material and adapted to be supported by the aid of a wall, a metallic plate overlying said base, a temperature responsive condition-controlling element supported by said plate and between the base and the plate, a sub-plate mounted on the inner surface of said plate and substantially coextensive therewith, and means carried by said sub-plate for detachably securing said plate to said base in spaced relation thereto.

4. In a thermostat: a base member of heat insulating material and adapted to be supported by the aid of a wall, a metallic plate overlying said base, a sub-plate mounted on the inner surface of said plate, said sub-plate being substantially coextensive with said plate and supported in spaced relation thereto, a metallic stud secured in good heat-conducting relation to the inner surface of said plate and extending through an opening in said sub-plate, a temperature responsive element supported by said stud and between said sub-plate and said base, and means carried by said sub-plate for detachably securing said plate to said base in spaced relation thereto.

5. In a thermostat: a mounting plate, a U-shaped bimetallic member mounted by one of its arms on said plate, a first contact element mounted on the free arm of said member, an adjusting screw extending through said plate in alignment with said first contact element, a second contact element mounted on the end of said screw adjacent said first contact element, a U-shaped stop element mounted by one of its arms on said plate and having its free arm so positioned as to engage the free arm of said member when the same is at a predetermined temperature and said second contact element is moved by said screw away from said first contact element, and means for adjustably positioning the free arm of said stop element with respect to its fixed arm.

6. In a thermostat: a mounting plate, a hollow stud secured to said plate, a U-shaped bimetallic member mounted by one of its arms on said stud, a first contact element mounted on the inner side of the free arm of said member, an adjusting screw threaded in said hollow stud and extending through said plate in alignment with said first contact element, a second contact element mounted on the inner end of said screw and cooperable with said first contact element, a U-shaped stop element also mounted by one of its arms on said stud and having its free arm so positioned as to engage the free arm of said member when the same is at a predetermined temperature and said second contact element is moved by said adjusting screw away from said first contact element, and screw means carried by said stop element for adjustably positioning its free arm with respect to its fixed arm.

7. In a thermostat: a mounting plate, a hollow stud secured to said plate, a U-shaped bimetallic member mounted by one of its arms on said stud, a first contact element mounted on the inner side of the free arm of said member, an adjusting screw threaded in said hollow stud and extending through said plate in alignment with said first contact element, a second contact element mounted on the inner end of said screw and cooperable with said first contact element, and a U-shaped element of resilient material also mounted by one of its arms on said stud and having the end portion of its free arm so positioned as to engage and apply a longitudinal outward force on the end of said screw adjacent said second contact element.

8. In a thermostat: a base of heat insulating material and adapted to be supported by the aid of a wall, a plate detachably mounted on said base, a temperature responsive condition-controlling element supported by said plate and between the base and the plate, and a sub-plate for supporting means associated with said element and so mounted on the inner surface of said plate as not to disfigure the outer surface thereof.

9. In a thermostat: a base member of heat insulating material and adapted to be supported by the aid of a wall, a metallic plate overlying said base, a temperature responsive element supported by said plate and between the base and the plate, electrical switching means actuated by the movement of said element, a sub-plate mounted on the inner surface of said plate, means carried by said sub-plate for detachably securing said plate to said base and including a contact member electrically connected to said switching means, and means carried by said base member and cooperable with said contact member for connecting the thermostat in an external electrical circuit.

10. In a thermostat: a base member of heat insulating material and adapted to be supported by the aid of a wall, a generally rectangular metallic plate overlying said base, a temperature responsive element supported by said plate and between the base and the plate, electrical switching means actuated by the movement of said element, a sub-plate mounted on the inner surface of said plate and substantially coextensive therewith, means carried by said sub-plate for detachably securing said plate to said base and including a contact member electrically connected to said switching means, said contact member serving as the sole support for one end of said plate, and means carried by said base member and cooperable with said contact member for connecting the thermostat in an external electrical circuit.

WILLIAM A. RAY.